US009994698B2

(12) United States Patent
Kawai

(10) Patent No.: US 9,994,698 B2
(45) Date of Patent: *Jun. 12, 2018

(54) RESIN COMPOSITION, RESIN FORMED PRODUCT AND MULTILAYER STRUCTURE

(71) Applicant: KURARAY CO., LTD., Kurashiki-shi (JP)

(72) Inventor: Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/026,379

(22) PCT Filed: Oct. 2, 2014

(86) PCT No.: PCT/JP2014/076440
§ 371 (c)(1),
(2) Date: Mar. 31, 2016

(87) PCT Pub. No.: WO2015/050222
PCT Pub. Date: Apr. 9, 2015

(65) Prior Publication Data
US 2016/0251500 A1 Sep. 1, 2016

(30) Foreign Application Priority Data

Oct. 2, 2013 (JP) .................. 2013-207779
Oct. 2, 2013 (JP) .................. 2013-207780

(51) Int. Cl.
| | |
|---|---|
| *C08K 5/07* | (2006.01) |
| *C08K 13/02* | (2006.01) |
| *B32B 27/18* | (2006.01) |
| *B29C 51/10* | (2006.01) |
| *B29C 51/14* | (2006.01) |
| *B32B 27/08* | (2006.01) |
| *B32B 27/28* | (2006.01) |
| *B32B 27/30* | (2006.01) |
| *B29C 47/00* | (2006.01) |
| *B29C 47/06* | (2006.01) |
| *B29C 47/60* | (2006.01) |
| *B29C 47/92* | (2006.01) |
| *C08L 23/16* | (2006.01) |

(52) U.S. Cl.
CPC .......... *C08K 13/02* (2013.01); *B29C 47/0021* (2013.01); *B29C 47/065* (2013.01); *B29C 47/6087* (2013.01); *B29C 47/92* (2013.01); *B29C 51/10* (2013.01); *B29C 51/14* (2013.01); *B32B 27/08* (2013.01); *B32B 27/18* (2013.01); *B32B 27/288* (2013.01); *B32B 27/306* (2013.01); *C08K 5/07* (2013.01); *C08L 23/16* (2013.01); *B29C 2947/92704* (2013.01); *B32B 2307/584* (2013.01); *B32B 2439/00* (2013.01)

(58) Field of Classification Search
CPC .................. C08K 5/07; C08L 29/04
See application file for complete search history.

(56) References Cited

U.S. PATENT DOCUMENTS

| | | | |
|---|---|---|---|
| 2002/0068806 A1* | 6/2002 | Yoshimi | .................. B32B 27/32 526/330 |
| 2006/0047040 A1 | 3/2006 | Shida et al. | |
| 2006/0155065 A1* | 7/2006 | Simon | .................. C08K 5/0008 525/168 |
| 2013/0040087 A1 | 2/2013 | Kazeto et al. | |

FOREIGN PATENT DOCUMENTS

| | | |
|---|---|---|
| CN | 101006130 A | 7/2007 |
| CN | 102906186 A | 1/2013 |
| EP | 1 162 216 A1 | 12/2001 |
| EP | 3 048 058 A1 | 7/2016 |
| JP | 64-72201 A | 2/1989 |
| JP | 04-227744 | 6/1992 |
| JP | 5-179001 A | 7/1993 |
| JP | 09-071620 | 3/1997 |
| JP | 11-060874 | 3/1999 |
| JP | 11-140136 A | 5/1999 |
| JP | 2001-072823 | 3/2001 |
| JP | 2001-354779 | 12/2001 |
| JP | 2004-124028 | 4/2004 |
| JP | 2007-031725 | 2/2007 |
| JP | 4326122 B2 | 9/2009 |
| JP | 2009-242645 | 10/2009 |
| WO | 2005/014716 | 2/2005 |
| WO | 2006/022256 | 3/2006 |
| WO | 2011/0125736 | 10/2011 |
| WO | 2013/146961 | 10/2013 |
| WO | 2013/146962 | 10/2013 |

OTHER PUBLICATIONS

International Search Report dated Dec. 16, 2014 for PCT/JP2014/076440 filed on Oct. 2, 2014.

* cited by examiner

*Primary Examiner* — Wenwen Cai
(74) *Attorney, Agent, or Firm* — Oblon, McClelland, Maier & Neustadt, L.L.P.

(57) ABSTRACT

Provided are a resin composition, a resin formed product and a multilayer structure that are superior in long-run workability in melt molding, and are capable of forming an article exhibiting inhibited coloring and generation of defects such as streaks and fish eyes and having superior appearance characteristics while generation of an odor is inhibited. The resin composition contains an ethylene-vinyl alcohol copolymer (A) and a saturated carbonyl compound (B) having 3 to 8 carbon atoms, wherein the saturated carbonyl compound (B) is a saturated aldehyde (B-1), a saturated ketone (B-2) or a combination thereof, and the content of the saturated carbonyl compound (B) is 0.01 ppm or greater and 100 ppm or less. The saturated aldehyde (B-1) is preferably propanal, butanal, hexanal or a combination thereof. The saturated ketone (B-2) is preferably acetone, methyl ethyl ketone, 2-hexanone or a combination thereof.

10 Claims, No Drawings

RESIN COMPOSITION, RESIN FORMED PRODUCT AND MULTILAYER STRUCTURE

TECHNICAL FIELD

The present invention relates to a resin composition, a resin formed product and a multilayer structure.

BACKGROUND ART

For forming containers, films, sheets and the like, melt molding using a resin composition is generally employed. Such a resin composition is desired to be capable of forming articles having less defects such as streaks and fish eyes and having superior appearance characteristics, and to be superior in properties for operation over a long time period (long-run workability), i.e., properties that the defects are less likely to be generated even in melt molding over a long time period, and the like. In particular, such defects not only deteriorate the appearance of the formed articles but also cause deterioration of performance; therefore, inhibition of the generation of defects is important.

On the other hand, ethylene-vinyl alcohol copolymers (hereinafter, may be also referred to as "EVOH(s)") are polymeric materials that are superior in gas barrier properties against oxygen and the like, oil resistance, antistatic properties, mechanical strength, and the like. Thus, EVOH-containing resin compositions have been widely used as forming materials of formed articles such as containers.

However, since EVOH has a comparatively active hydroxyl group in its molecule, an oxidization reaction and a crosslinking reaction are caused in a molten state at high temperatures even in the interior of an extrusion molding machine in a state being almost free from oxygen, and thus thermal deterioration products may be generated. In particular, when a continuous operation is carried out over a long time period, the thermal deterioration products are likely to be deposited in the forming machine, leading to occurrence of gelation that accounts for fish eyes. Thus, insufficient long-run workability tends to be caused in the melt molding using the EVOH-containing resin composition.

In order to overcome such disadvantages, a variety of EVOH-containing resin compositions have been developed. For example, an EVOH-containing resin composition that exhibits improved long-run workability during the melt molding due to containing a boron compound, sodium acetate and magnesium acetate (see Japanese Unexamined Patent Application, Publication No. H11-60874), an EVOH-containing resin composition that inhibits the occurrence of gelation on melt molding due to containing a conjugated polyene compound (see Japanese Unexamined Patent Application, Publication No. H9-71620), an EVOH-containing resin composition that is superior in thermal stability and exhibits inhibited oxidative gel formation at elevated temperatures due to containing a specific carboxylic acid metal salt and a hindered phenol antioxidant (see Japanese Unexamined Patent Application, Publication No. H4-227744), and the like have been developed.

However, according to these conventional EVOH-containing resin compositions, the improvement of the long-run workability is unsatisfactory, and additionally, when a large amount of the metal salt is contained in the resin composition, the formed article tends to be yellowed, leading to an unfavorable appearance. Moreover, in consideration of the environment, for example, in light of a reduction in amounts of basic materials and waste of formed articles such as packaging materials, a reduction in thickness of the formed articles has been desired. Such a reduction in thickness is likely to be accompanied by the unfavorable appearance, and therefore a further improvement of the appearance has been needed. Additionally, an odor in molding must be taken into consideration from an environmental viewpoint.

PRIOR ART DOCUMENTS

Patent Documents

Patent Document 1: Japanese Unexamined Patent Application, Publication No. H11-60874
Patent Document 2: Japanese Unexamined Patent Application, Publication No. H9-71620
Patent Document 3: Japanese Unexamined Patent Application, Publication No. H4-227744
Patent Document 4: Japanese Unexamined Patent Application, Publication No. 2007-31725
Patent Document 5: Japanese Unexamined Patent Application, Publication No. 2001-72823

SUMMARY OF THE INVENTION

Problems to be Solved by the Invention

The present invention was made in view of the foregoing circumstances, and an objective of the present invention is to provide a resin composition, a resin formed product and a multilayer structure that are superior in long-run workability in melt molding, and are capable of forming a formed article exhibiting inhibited coloring and generation of defects such as streaks and fish eyes and having superior appearance characteristics while generation of an odor is inhibited.

Means for Solving the Problems

According to an aspect of the invention made for solving the aforementioned problems, a resin composition contains an ethylene-vinyl alcohol copolymer (A) and a saturated carbonyl compound (B) having 3 to 8 carbon atoms, wherein the saturated carbonyl compound (B) is a saturated aldehyde (B-1), a saturated ketone (B-2) or a combination thereof, and the content of the saturated carbonyl compound (B) is 0.01 ppm or greater and 100 ppm or less.

Due to containing the EVOH (A) and the specified amount of the saturated carbonyl compound (B), the resin composition according to the aspect of the present invention exhibits inhibited coloring and generation of defects such as streaks and fish eyes on melt molding, leading to superior appearance characteristics of the formed article. Thus, demands for a reduction in thickness can be satisfied while the deterioration of the appearance is inhibited, and a reduction in amounts of basic materials and waste can be achieved. Moreover, the resin composition is less likely to generate defects and an odor even in melt molding over a long time period, and exhibits sufficient long-run workability.

Although not necessarily clarified, the action of inhibiting the generation of defects due to containing the specified amount of the saturated carbonyl compound (B) is presumed to result from greater readiness of the saturated carbonyl compound (B) for oxidation than that of the EVOH (A). More specifically, thermal deterioration products such as gelled substances would be generated as a result of oxidative degradation of the EVOH (A), and preferential oxidization of the saturated carbonyl compound (B) as compared to the EVOH (A) would lead to inhibition of the generation of the thermal deterioration products.

The saturated aldehyde (B-1) is preferably propanal, butanal, hexanal or a combination thereof. The saturated ketone (B-2) is preferably acetone, methyl ethyl ketone, 2-hexanone or a combination thereof. When the resin composition thus contains any of the specified saturated carbonyl compounds as the saturated carbonyl compound (B), the coloring and the generation of the defects due to the melt molding are further inhibited, leading to more superior appearance characteristics of the formed article.

It is preferred that the resin composition further contains a boron compound. The content of the boron compound is preferably 100 ppm or greater and 5,000 ppm or less. When the specified amount of the boron compound is thus further contained, the occurrence of gelation may be inhibited during the melt molding, and additionally a torque fluctuation of an extrusion molding machine or the like, i.e., a variation of a viscosity during heating can be inhibited. Thus, formed articles such as containers having superior appearance characteristics can be formed, and additionally the long-run workability can be more improved.

It is preferred that the resin composition further contains a conjugated polyene compound. The content of the conjugated polyene compound is preferably 0.01 ppm or greater and 1,000 ppm or less. When the specified amount of the conjugated polyene compound is thus further contained, the oxidative degradation during the melt molding can be inhibited. Thus, the coloring and the generation of the defects can be further inhibited, leading to the formation of formed articles having more superior appearance characteristics, and additionally the long-run workability can be more improved.

The conjugated polyene compound is preferably sorbic acid, a sorbic acid salt or a combination thereof. When sorbic acid, the sorbic acid salt or a combination thereof is thus contained, the oxidative degradation during the melt molding can be inhibited more effectively. Thus, the coloring and the generation of the defects can be further inhibited, leading to an improvement of the appearance characteristics of the formed article, and additionally the long-run workability can be more improved.

It is preferred that the resin composition further contains at least one of acetic acid and an acetic acid salt. The total content of acetic acid and the acetic acid salt is preferably 50 ppm or greater and 1,000 ppm or less. When the specified amount of the acetic acid compound is further contained, the coloring of the formed article can be further inhibited.

It is preferred that the resin composition further contains a phosphorus compound. The content of the phosphorus compound is preferably 1 ppm or greater and 200 ppm or less. When the specified amount of the phosphorus compound is thus further contained, the coloring and the generation of the defects can be further inhibited, leading to a further improvement of the appearance characteristics of the formed article, and additionally the long-run workability can be more improved.

According to another aspect of the present invention, a resin formed product and a multilayer structure that are formed from the resin composition are provided. Since the resin formed product and the multilayer structure are formed from the resin composition, generation and deposition of the thermal deterioration products during the melt molding may be inhibited. Thus, the deposition and adhesion of the thermal deterioration products in and around a die during the formation of the resin formed product and the multilayer structure is inhibited, and consequently even a resin formed product and a multilayer structure formed in a continuous operation over a long time period are likely to have a superior appearance.

Effects of the Invention

According to the resin composition of the aspect of the present invention, the coloring and the generation of the defects during the melt molding can be inhibited, and consequently formed articles having superior appearance characteristics can be provided. In addition, according to the resin composition, even when melt molding is executed over a long time period, defects and an odor are less likely to be generated, and consequently superior long-run workability can be exhibited. Thus, the resin composition can be formed into containers, films, sheets and the like, and the formed products can be suitably used as a multilayer structure and various types of packaging materials.

DESCRIPTION OF EMBODIMENTS

Hereinafter, embodiments of the present invention will be described. However, the present invention is by no means limited to the following embodiments. In addition, with respect to materials exemplified in the following, one type of the materials may be used alone, or two or more types thereof may be used in combination, unless otherwise specified particularly.

Resin Composition

The resin composition contains EVOH (A) and a saturated carbonyl compound (B). The saturated carbonyl compound (B) is a saturated aldehyde (B-1), a saturated ketone (B-2) or a combination thereof. Moreover, the resin composition may further contain as a favorable component, a boron compound, a conjugated polyene compound, an acetic acid compound and a phosphorus compound. The resin composition may contain other optional component, within a range not leading to impairment of the effects of the present invention. Hereinafter, the EVOH (A), the saturated carbonyl compound (B), the boron compound, the conjugated polyene compound, the acetic acid compound, the phosphorus compound and other optional component will be described in more detail.

As used herein, "ppm" means a mass proportion of a pertinent component in the resin composition, and 1 ppm means 0.0001% by mass. The "content of a boron compound" means a content as a mass in terms of boric acid equivalent. The "content of the acetic acid salt" means a content as a mass in terms of acetic acid equivalent. The "content of the phosphorus compound" means a content as a mass in terms of phosphorus element.

EVOH (A)

The EVOH (A) is an ethylene-vinyl alcohol copolymer obtained by saponifying a copolymer of ethylene and a vinyl ester.

The vinyl ester is exemplified by vinyl acetate, vinyl propionate, vinyl pivalate, and the like, and vinyl acetate is preferred. These vinyl esters may be used either alone, or two or more types thereof may be used in combination.

The EVOH (A) may have other structural unit derived from a monomer other than ethylene and the vinyl ester. Such a monomer is exemplified by polymerizable compounds, e.g.: vinylsilane compounds; unsaturated hydrocarbons such as propylene and butylene; unsaturated carboxylic acids such as (meth)acrylic acid; vinylpyrrolidones such as N-vinylpyrrolidone; and the like. The content of the other structural unit is preferably 0.0002 mol % or greater and 0.2 mol % or less with respect to the total structural units of the EVOH (A).

The lower limit of the ethylene content of the EVOH (A) is typically 20 mol %, preferably 24 mol %, and more preferably 27 mol %. On the other hand, the upper limit of the ethylene content of the EVOH (A) is typically 60 mol %, preferably 55 mol %, more preferably 45 mol %, still more preferably 42 mol %, and particularly preferably 38 mol %. When the ethylene content is less than the lower limit, thermal stability in the melt extrusion may be deteriorated, leading to ease of gelation, and consequently defects such as streaks and fish eyes are likely to be generated. In particular, when an operation is made over a long time period under conditions involving a higher temperature or a higher speed than those for general melt extrusion, the gelation is highly likely to occur. On the other hand, when the ethylene content is greater than the upper limit, the gas barrier properties, and the like may be deteriorated, and the advantageous characteristics of the EVOH may not be sufficiently exhibited.

The lower limit of the degree of saponification of the structural unit derived from the vinyl ester in the EVOH (A) is typically 85%, preferably 90%, more preferably 98%, and still more preferably 99%. When the degree of saponification is less than the lower limit, insufficient thermal stability may be caused.

The lower limit of the content of the EVOH (A) in the resin composition is typically 95% by mass, preferably 98.0% by mass, more preferably 99.0% by mass, and still more preferably 99.5% by mass. When the content of the EVOH (A) is equal to or greater than the lower limit, the advantageous characteristics of the EVOH can be sufficiently exhibited, and accordingly the formed products and the like obtained from the resin composition may exhibit superior gas barrier properties, oil resistance, and the like.

Saturated Carbonyl Compound (B)

The saturated carbonyl compound (B) is any one of a saturated aldehyde (B-1) and a saturated ketone (B-2), or a combination thereof. The saturated carbonyl compound (B) inhibits the coloring and the generation of defects such as streaks and fish eyes on melt molding, and additionally improves the long-run workability. The saturated carbonyl compound (B) as referred to herein means a compound that does not include an unsaturated bond in a moiety other than the carbonyl group.

The saturated aldehyde (B-1) may be a linear aldehyde, a branched aldehyde, or an aldehyde having a ring structure in a molecule thereof as long as the saturated aldehyde (B-1) does not include an unsaturated bond in the moiety other than the aldehyde group. The saturated aldehyde (B-1) may have one, or two or more aldehyde groups in a molecule thereof.

Examples of the saturated aldehyde (B-1) include propanal, butanal, pentanal, hexanal, heptanal, octanal, cyclohexanecarbaldehyde, cyclopentanecarbaldehyde, methylcyclohexanecarbaldehyde, methylcyclopentylaldehyde, and the like.

The saturated ketone (B-2) may be a linear ketone, a branched ketone, or a ketone having a ring structure in a molecule as long as the saturated ketone (B-2) does not include an unsaturated bond in the moiety other than the carbonyl group. The saturated ketone (B-2) may have one, or two or more carbonyl groups in a molecule thereof. The saturated ketone (B-2) is exemplified by a saturated aliphatic ketones and a saturated cyclic ketone.

Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3-heptanone, 4-heptanone, 4-methyl-2-hexanone, 5-methyl-2-hexanone, 2,4-dimethyl-3-pentanone, 2-octanone, 3-methyl-2-heptanone, 5-methyl-3-heptanone, 3-octanone, 6-methyl-2-heptanone, methyl cyclopentyl ketone, methyl cyclohexyl ketone, and the like.

Examples of the saturated cyclic ketone include cyclobutanone, cyclopentanone, cyclohexanone, cycloheptanone, cyclooctanone, and the like.

In light of an improvement of the solubility of the saturated carbonyl compound (B) in water, the number of carbon atoms of the saturated carbonyl compound (B) is preferably 3 to 50, more preferably 3 to 15, and still more preferably 3 to 8.

In light of the inhibition of the coloring and the generation of the defects due to the melt molding, and an improvement of the long-run workability, the saturated aldehyde (B-1) is preferably propanal, butanal, hexanal or a combination thereof, and more preferably propanal, among the saturated aldehydes exemplified.

In light of the inhibition of the coloring and the generation of the defects due to the melt molding, and an improvement of the long-run workability, the saturated ketone (B-2) is preferably a saturated aliphatic ketone, more preferably acetone, methyl ethyl ketone, 2-hexanone or a combination thereof, and still more preferably acetone, among the saturated ketones exemplified.

A part or all of hydrogen atoms included in the saturated carbonyl compound (B) (except for the hydrogen atom of the aldehyde group of the saturated aldehyde (B-1)) may be substituted with a substituent within a range not leading to impairment of the effects of the present invention. The substituent is exemplified by a halogen atom, a hydroxy group, an amino group, an amide group, a cyano group, and the like.

The lower limit of the content of the saturated carbonyl compound (B) in the resin composition is 0.01 ppm, preferably 0.05 ppm, more preferably 0.1 ppm, still more preferably 0.15 ppm, and particularly preferably 0.2 ppm. The upper limit of the content of the saturated carbonyl compound (B) is 100 ppm, preferably 95 ppm, more preferably 50 ppm, still more preferably 30 ppm, and particularly preferably 20 ppm. When the content of the saturated carbonyl compound (B) is less than the lower limit, the effects exerted by the incorporation of the saturated carbonyl compound (B), for example, the inhibition of the coloring and the generation of the defects may not be satisfactorily exhibited. On the other hand, when the content of the saturated carbonyl compound (B) is greater than the upper limit, oxidization and/or crosslinking involving the saturated carbonyl compound (B) in the resin composition is/are likely to occur during melt molding, and consequently the occurrence of gelation may be induced. Moreover, the resin composition is likely to be colored.

Boron Compound

The boron compound inhibits gelation in the melt molding, and additionally inhibits a torque fluctuation of an extrusion molding machine or the like, i.e., a variation of a viscosity during heating. Examples of the boron compound include:

boric acids such as orthoboric acid, metaboric acid and tetraboric acid;

boric acid esters such as triethyl borate and trimethyl borate;

boric acid salts such as alkali metal salts and alkaline earth metal salts of the aforementioned boric acids, and borax;

boron hydrides; and the like. Of these, boric acids are preferred, and orthoboric acid (hereinafter, may be also referred to as "boric acid") are more preferred. The lower limit of the content of the boron compound in the resin composition is preferably 100 ppm, and more preferably 150 ppm. The upper limit of the content of the boron compound is preferably 5,000 ppm, more preferably 4,000 ppm, and still more preferably 3,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and the appearance of the formed article may be deteriorated.

Conjugated Polyene Compound

The conjugated polyene compound inhibits oxidative degradation in melt molding. The "conjugated polyene compound" as referred to herein means a compound having a conjugated double bond, as generally referred to, i.e., a compound having two or more carbon-carbon double bonds and a structure in which a carbon-carbon double bond and a carbon-carbon single bond are alternately connected. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in a single molecule, such as tung oil, may also be included in the conjugated polyene compound.

The conjugated polyene compound preferably has 7 or less conjugated double bonds. When the resin composition contains a conjugated polyene compound having 8 or more conjugated double bonds, the coloring of the formed article is likely to occur.

The conjugated polyene compound may be used either alone, or two or more types thereof may be used in combination. The conjugated polyene compound has preferably 4 to 30 carbon atoms, and more preferably 4 to 10 carbon atoms. The conjugated polyene compound is preferably sorbic acid, a sorbic acid ester, a sorbic acid salt, myrcene or a mixture of two or more of these, and more preferably sorbic acid, a sorbic acid salt (sodium sorbate, potassium sorbate, or the like) or a mixture thereof. Sorbic acid, the sorbic acid salt and a mixture thereof exhibit superior inhibitory effects on oxidative degradation at high temperatures, and are preferred also in light of hygienic properties and availability since they are industrially used broadly also as food additives. The upper limit of the molecular weight of the conjugated polyene compound is typically 1,000, preferably 500, and more preferably 300. When the molecular weight of the conjugated polyene compound is greater than the upper limit, the state of dispersion of the conjugated polyene compound in the EVOH (A) may be inferior, and the appearance after the melt molding may be unfavorable. The lower limit of the content of the conjugated polyene compound in the resin composition is preferably 0.01 ppm, more preferably 0.1 ppm, still more preferably 0.5 ppm, and particularly preferably 1 ppm. The upper limit of the content is preferably 1,000 ppm, more preferably 800 ppm, and still more preferably 500 ppm. When the content of the conjugated polyene compound is less than the lower limit, the inhibitory effects on oxidative degradation in the melt molding may not be sufficiently achieved. On the other hand, when the content of the conjugated polyene compound is greater than the upper limit, the gelation of the resin composition may be facilitated.

Acetic Acid Compound

The acetic acid compound prevents the coloring of the formed article, and additionally inhibits gelation during melt molding. The acetic acid compound includes acetic acid and an acetic acid salt. As the acetic acid compound, acetic acid and an acetic acid salt (sodium acetate, potassium acetate, or the like) are preferably used in combination, and acetic acid and sodium acetate are more preferably used in combination.

The lower limit of the content of the acetic acid compound in the resin composition is preferably 50 ppm, more preferably 100 ppm, still more preferably 150 ppm, and particularly preferably 200 ppm. The upper limit of the content of the acetic acid compound is preferably 1,000 ppm, more preferably 500 ppm, and still more preferably 400 ppm. When the content of the acetic acid compound is less than the lower limit, sufficient coloring preventive effects may not be achieved, and yellowing of the formed article may occur. On the other hand, when the content of the acetic acid compound is greater than the upper limit, gelation is likely to occur in the melt molding, in particular, in melt molding over a long time period, and consequently the appearance of the formed article may be deteriorated.

Phosphorus Compound

The phosphorus compound inhibits the coloring and the generation of defects such as streaks and fish eyes, and additionally improves the long-run workability. Examples of the phosphorus compound include phosphoric acid, phosphorous acid, phosphates, phosphites, and the like. The phosphate may be in any form of a monobasic phosphate salt, a dibasic phosphate salt and a tribasic phosphate salt. In addition, the cationic species contained in the phosphate is not particularly limited, and alkali metal salts and alkaline earth metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred. The lower limit of the content of the phosphorus compound in the resin composition is preferably 1 ppm, more preferably 2 ppm, still more preferably 3 ppm, and particularly preferably 5 ppm. The upper limit of the content of the phosphorus compound is preferably 200 ppm, more preferably 150 ppm, and still more preferably 100 ppm. When the content of the phosphorus compound is less than the lower limit, or when the content of the phosphorus compound is greater than the upper limit, the thermal stability may be deteriorated, and the coloring and the occurrence of gelation are likely to occur in the melt molding over a long time period.

Other Optional Component

The resin composition may contain other optional component, within a range not leading to impairment of the effects of the present invention. The other optional component is exemplified by an alkali metal, an antioxidant, an UV absorbent, a plasticizer, an antistatic agent, a lubricant, a colorant, a filler, a heat stabilizer, other resin, a metal salt of a higher aliphatic carboxylic acid, and the like. The resin composition may contain two or more types of these optional components, and the total content of the optional component is preferably 1% by mass or less with respect to the resin composition.

It is to be noted that in order to inhibit the gelation, for example, a hindered phenol compound or a hindered amine compound, a metal salt of a higher aliphatic carboxylic acid, a hydrotalcite compound or the like may be added. These may be used either alone, or two or more types thereof may be used in combination. The amount of the compound added to inhibit the gelation is typically 0.01% by mass or greater and 1% by mass or less.

Production Method of Resin Composition

The production method of the resin composition is not particularly limited as long as the saturated carbonyl compound (B) can be homogeneously blended into the EVOH (A), and additionally the saturated carbonyl compound (B) is contained in the finally obtained resin composition in an amount of 0.01 ppm or greater and 100 ppm or less. The resin composition can be obtained, for example, by a production method including the steps of: copolymerizing ethylene with a vinyl ester (hereinafter, may be also referred to as "step (1)"); and saponifying the copolymer obtained in the step (1) (hereinafter, may be also referred to as "step (2)").

The procedure for incorporating the specified amount of the saturated carbonyl compound (B) into the resin composition is not particularly limited, and is exemplified by: a procedure in which the specified amount of the saturated carbonyl compound (B) is added in the step (1); a procedure in which the specified amount of the saturated carbonyl compound (B) is added in the step (2); a procedure in which the specified amount of the saturated carbonyl compound (B) is added to the EVOH (A) obtained in the step (2); and the like.

However, when the procedure in which the specified amount of the saturated carbonyl compound (B) is added in the step (1), or the procedure in which the specified amount of the saturated carbonyl compound (B) is added in the step (2) is employed, in order to incorporate a desired amount of the saturated carbonyl compound (B) into the resulting resin composition, it is necessary to increase the amount of the added saturated carbonyl compound (B) taking into consideration the amount of the saturated carbonyl compound (B) consumed in the polymerization reaction in the step (1) and/or the saponification reaction in the step (2). However, too large amount of the saturated carbonyl compound (B) may inhibit these reactions. Moreover, since the amount of the consumed saturated carbonyl compound (B) may vary depending on the conditions of the polymerization reaction in the step (1) and/or the saponification reaction in the step (2), it would be difficult to regulate the content of the saturated carbonyl compound (B) in the resin composition. Therefore, the procedure in which later than the step (2), the specified amount of the saturated carbonyl compound (B) is added to the EVOH (A) obtained in the step (2) is preferred.

The procedure for adding the specified amount of the saturated carbonyl compound (B) to the EVOH (A) is exemplified by: a procedure in which a blend of the saturated carbonyl compound (B) with the EVOH (A) prepared beforehand is pelletized; a procedure in which a strand obtained by deposition after the saponification of the ethylene-vinyl ester copolymer is impregnated with the saturated carbonyl compound (B); a procedure in which a strand obtained by deposition is impregnated with the saturated carbonyl compound (B) after cutting the strand; a procedure in which the saturated carbonyl compound (B) is added to a solution of redissolved chips of a dry resin composition; a procedure in which the EVOH (A) and the saturated carbonyl compound (B) are melt kneaded; a procedure in which the saturated carbonyl compound (B) is fed to be contained in a melt of the EVOH (A) during extrusion; a procedure in which a masterbatch is produced by blending a high concentration of the saturated carbonyl compound (B) with a part of the EVOH (A) and pelletizing the blend, and the masterbatch is dry-blended with the EVOH (A) to give a mixture which is then melt-kneaded, and the like.

Of these, in light of a possibility of homogeneously dispersing a slight amount of the saturated carbonyl compound (B) in the EVOH (A), the procedure in which a blend of the saturated carbonyl compound (B) with the EVOH (A) prepared beforehand is pelletized is preferred as the procedure for adding the saturated carbonyl compound (B). Specifically, the addition of the saturated carbonyl compound (B) is preferably carried out by adding the saturated carbonyl compound (B) to a solution prepared by dissolving the EVOH (A) in a good solvent such as a mixed solvent of water and methanol, and extruding thus resulting mixture solution into a poor solvent through a nozzle or the like to permit deposition and/or coagulation, followed by washing and/or drying the same. In this procedure, the resin composition is obtained in the form of pellets in which the saturated carbonyl compound (B) is homogeneously mixed with the EVOH (A).

The procedure for incorporating each component other than the saturated carbonyl compound (B) into the resin composition is exemplified by: a procedure in which the pellets are mixed with each component, followed by melt-kneading; a procedure in which each component is mixed together with the saturated carbonyl compound (B) in preparing the pellets; a procedure in which the pellets are immersed in a solution containing each component; and the like. It is to be noted that a ribbon blender, a high speed mixer, a cokneader, a mixing roll, an extruder, an intensive mixer and the like may be employed for mixing the pellets and other component(s).

Resin Formed Product

The resin formed product according to another embodiment of the present invention is formed from the resin composition. The resin formed product is exemplified by a film, a sheet, a container, a pipe, a hose, a fiber, a packaging material, and the like. The "film" as referred to means a formed product typically having a thickness of less than 300 μm, whereas the "sheet" as referred to means a formed product typically having a thickness of 300 μm or greater. The resin formed product may be formed, for example, by melt molding, and a secondary forming processing as needed. Examples of the method for the melt molding include extrusion molding, inflation extrusion, blow molding, melt spinning, injection molding, injection blow molding, and the like. The melt molding temperature may vary depending on the melting point of the EVOH (A), and the like, and is preferably 150° C. or greater and 270° C. or less. Examples of the secondary forming processing include bending processing, vacuum forming, blow molding, press forming, and the like.

Multilayer Structure

The multilayer structure according to still another embodiment of the present invention includes a layer (hereinafter, may be also referred to as "resin composition layer") formed from the resin composition described above. The layer structure of the multilayer structure is not particularly limited. Preferably, the multilayer structure includes a layer (hereinafter, may be also referred to as "thermoplastic resin layer") formed from a thermoplastic resin, and more preferably, the thermoplastic resin layer is arranged adjacent to the resin composition layer. The thermoplastic resin layer may be provided as an adhesive resin layer. The adhesive resin layer binds other resin layers with each other, and has a lower melting point or a softening point than that of the other resin layers.

Preferable examples of the thermoplastic resin for forming the thermoplastic resin layer include:

high-density, medium-density or low-density polyethylenes;

polyethylenes prepared through copolymerization with vinyl acetate, an acrylic acid ester, or an α-olefin such as butene or hexene;

ionomer resins;

polypropylene homopolymers;

polypropylenes prepared through copolymerization with an α-olefins such as ethylene, butene or hexene;

polyolefins such as modified polypropylenes obtained by blending a rubber polymer into polypropylenes;

resins obtained by addition or grafting of maleic anhydride to these resins; and polyesters.

Furthermore, examples of the thermoplastic resin include polyamides, polystyrenes, polyvinyl chlorides, acrylic resins, polyurethanes, polycarbonates, polyvinyl acetates, and the like.

In light of formability and cost, the layer structure of the multilayer structure is exemplified by:

thermoplastic resin layer/resin composition layer/thermoplastic resin layer;

resin composition layer/thermoplastic resin layer (adhesive resin layer)/thermoplastic resin layer;

thermoplastic resin layer/thermoplastic resin layer (adhesive resin layer)/resin composition layer/thermoplastic resin layer (adhesive resin layer)/thermoplastic resin layer, and the like. In a case where the multilayer structure includes a plurality of thermoplastic resin layers, the plurality of thermoplastic resin layers may be formed of resins different from one another, or may be formed of an identical resin.

Of these, the layer structure "thermoplastic resin layer/resin composition layer/thermoplastic resin layer" is preferred, and a layer structure in which a thermoplastic resin layer formed of a polyester resin composition is laminated on both sides of the resin composition layer is more preferred.

The method for obtaining the multilayer structure is not particularly limited, and examples thereof include an extrusion lamination process, a dry lamination process, an extrusion blow molding process, a coextrusion lamination process, a coextrusion sheet molding process, a coextrusion pipe molding process, a coextrusion blow molding process, a coinjection molding process, a solution coating process, and the like. It is to be noted that the multilayer structure obtained in such a method may be heated again at the melting point of the EVOH (A) or lower and then subjected to a secondary processing by vacuum/pressure deep drawing forming, blow molding, or the like.

It is to be noted that scraps generated in forming the multilayer structure may be blended with the thermoplastic resin layer for recycling, or may be used separately.

EXAMPLES

Hereinafter, the present invention is specifically explained by way of Examples, but the present invention is not in anyhow limited to these Examples.

(1) Moisture Content of Hydrous EVOH Pellets

The moisture content of hydrous EVOH pellets was determined under conditions involving a drying temperature of 180° C., a drying time period of 20 min and a sample amount of about 10 g using a halogen moisture analyzer "HR73" available from Mettler-Toledo International Inc. The moisture content of the hydrous EVOH set forth in the following is expressed in % by mass with respect to the mass of the dry EVOH.

(2) Ethylene Content and Degree of Saponification of EVOH (A)

The determination was made based on $^1$H-NMR recorded on a nuclear magnetic resonance apparatus ("a nuclear magnetic resonance apparatus with a superconducting magnet Lambda500" available from JEOL, Ltd.) using DMSO-$d_6$ as a solvent for measurement.

(3) Content of Acetic Acid and Acetic Acid Salt

Dry EVOH pellets were ground by freeze grinding. The obtained grind EVOH was sieved with a sieve having a nominal dimension of 1 mm (according to JISZ8801-1 to 3). Ten grams of the EVOH powder having passed the sieve and 50 mL of ion exchanged water were charged into a stoppered 100 mL Erlenmeyer flask, and stirred 95° C. for 10 hours after the stoppered Erlenmeyer flask was equipped with a cooling condenser. Two mL of the resulting solution was diluted with 8 mL of ion exchanged water. The amount of the acetic acid ion in this diluted solution was quantitatively determined using an ion chromatography "ICS-1500" available from Yokogawa Electric Corporation, according to the following measurement conditions, whereby the amount of the acetic acid and the acetic acid ion was calculated. The obtained value was designated as the content of acetic acid and the acetic acid salt. It is to be noted that in the quantitative determination, a calibration curve created using acetic acid was used.

Measurement Conditions:

column: "IonPAC ICE-AS1 (9φ×250 mm, electric conductivity detector)" available from DIONEX;

eluent: 1.0 mmol/L aqueous octanesulfonic acid solution;

measurement temperature: 35° C.;

eluent flow rate: 1 mL/min;

amount used for the analysis: 50 μL.

(4) Quantitative Determination of Metal Ion

Into a polytetrafluoroethylene pressure container available from Actac Project Services Corporation were charged 0.5 g of dry EVOH pellets, and 5 mL of nitric acid for accurate analysis available from Wako Pure Chemical Industries, Ltd. was further added thereto. After the pressure container was left to stand for 30 min, the container was closed with a cap lip having a rupture disk, and the dry EVOH pellets were treated at 150° C. for 10 min, and then 180° C. for 10 min using a microwave high speed decomposition system "speedwave MWS-2" available from Actac Project Services Corporation, whereby the dry EVOH pellets were decomposed. In a case where the decomposition of the dry EVOH pellets was incomplete, the treatment conditions were appropriately adjusted. The resulting decomposition product was diluted with 10 mL of ion exchanged water, all the liquid was transferred to a 50 mL volumetric flask, and the volume of the liquid was adjusted to 50 mL with ion exchanged water, whereby a decomposition product solution was prepared.

The decomposition product solution thus obtained was subjected to a quantitative determination analysis at the measurement wavelength set forth below using an ICP optical emission spectrophotometer "Optima 4300 DV" available from PerkinElmer Japan Co., Ltd., whereby the amounts of the metal ion, the phosphorus compound and the boron compound were quantitatively determined. The amount of the phosphorus compound was calculated as a mass in terms of phosphorus element equivalent after the quantitative determination of the phosphorus element. The content of the boron compound was calculated as a mass in terms of boric acid equivalent.

Na: 589.592 nm;
K: 766.490 nm;
Mg: 285.213 nm;
Ca: 317.933 nm;
P: 214.914 nm;
B: 249.667 nm;
Si: 251.611 nm;
Al: 396.153 nm;
Zr: 343.823 nm;
Ce: 413.764 nm;
W: 207.912 nm; and
Mo: 202.031 nm.

(5) Content of Saturated Carbonyl Compound (B)

An adjusted 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass solution of DNPH. Thereafter, 1 g of dry resin composition pellets were added to 20 mL of the adjusted DNPH solution, and the mixture was stirred at 35° C. for 1 hour to dissolve the dry resin composition pellets. Acetonitrile was added to this solution to permit precipitation of the EVOH (A), followed by filtration and concentration of the solution, whereby an extraction sample was obtained. This extraction sample was analyzed for quantitative determination by high performance liquid chromatography, whereby the saturated carbonyl compound (B) (saturated aldehyde (B-1) or saturated ketone (B-2)) was quantitatively determined. It is to be noted that in the quantitative determination, a calibration curve created using an authentic sample prepared by reacting each saturated carbonyl compound (B) with the adjusted DNPH solution was used.

column: TSKgel ODS-80 Ts (available from Tosoh Corporation)
mobile phase: water/acetonitrile=52:48 (volume ratio)
detector: photodiode array detector (360 nm), TOF-MS (6) Content of Conjugated Polyene Compound Dry resin composition pellets were ground by freeze grinding, and 10 g of a ground matter obtained by eliminating coarse particles using a sieve having a nominal dimension of 0.150 mm (100 mesh, according to JIS Z8801-1 to 3) was packed into a Soxhlet extraction apparatus to execute an extraction treatment using 100 mL of chloroform for 48 hours. This extraction liquid was analyzed for quantitative determination by high performance liquid chromatography to quantitatively determine the amount of the conjugated polyene compound. It is to be noted that in the quantitative determination, a calibration curve created using an authentic sample of each conjugated polyene compound was used.

Synthesis of EVOH (A)

Synthesis Example 1

Using a 250 L pressure reactor, the polymerization was carried out under the following conditions to synthesize an ethylene-vinyl acetate copolymer.

Amount Charged
vinyl acetate: 83.0 kg;
methanol: 26.6 kg;
feed rate of 2,2'-azobis(4-methoxy-2,4-dimethylvaleronitrile) (2.5 g/L methanol solution): 1,119.5 mL/hr.
Polymerization Conditions
polymerization temperature: 60° C.;
pressure of ethylene in polymerization tank: 3.6 MPa;
polymerization time period: 5.0 hours.

The conversion of vinyl acetate in the resulting copolymer was about 40%. After sorbic acid was added to this copolymerization reaction mixture, the reaction mixture was supplied to a purge tower, and unreacted vinyl acetate was eliminated from the top of the tower by introducing methanol vapor from the bottom of the tower, whereby a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was further added methanol to adjust the copolymer concentration to 20% by mass. The temperature of this solution was elevated to 60° C., and the reaction was allowed while blowing nitrogen gas into the reactor for about 4 hours. This solution was then extruded into water from a die plate provided with a circular opening to permit deposition, followed by cutting to give pellets having a diameter of about 3 mm and a length of about 5 mm. The pellets were subjected to deliquoring using a centrifugal separator, and an operation of further adding a large amount of water thereto and deliquoring the pellets was repeated.

Synthesis Example 2

Pellets were obtained by polymerizing, saponifying, pelletizing and washing in a similar manner to Synthesis Example 1 except that propanal was supplied so as to attain the propanal concentration of 0.5 ppm during the polymerization.

Synthesis Example 3

Pellets were obtained by polymerizing, saponifying, pelletizing and washing in a similar manner to Synthesis Example 1 except that acetone was supplied so as to attain the acetone concentration of 0.5 ppm during the polymerization.

Preparation of Resin Composition

Examples 1 to 9, 12 to 18 and 21, and Comparative Example 2

Twenty kg of the pellets obtained by deliquoring in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added the saturated aldehyde (B-1) and the conjugated polyene compound, and this mixture was further stirred for 1 hour such that the saturated aldehyde (B-1) and the conjugated polyene compound were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. After the resulting porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined using the method for quantitative determination. It is to be noted that resin compositions were prepared such that the content of each component was as shown in Tables 1 and 2 by adjusting the amount of the saturated aldehyde (B-1) added, and the concentration of each component in the aqueous solution for the immersion treatment.

Example 10

Resin composition pellets were prepared in a similar manner to Example 1 except that myrcene was used in place of sorbic acid as the conjugated polyene compound.

Example 11

Resin composition pellets were prepared in a similar manner to Example 1 except that potassium sorbate was used in place of sorbic acid as the conjugated polyene compound.

Example 19

Resin composition pellets were prepared in a similar manner to Example 1 except that butanal was used in place of propanal as the saturated aldehyde.

Example 20

Resin composition pellets were prepared in a similar manner to Example 1 except that hexanal was used in place of propanal as the saturated aldehyde.

Comparative Example 1, 3 and 4

Twenty kg of the pellets obtained in Synthesis Example 2 were added to 180 kg of a mixed solvent of water and methanol (mass ratio: water/methanol=40/60), and the mixture was stirred at 60° C. for 6 hours to completely dissolve the pellets. To the solution thus obtained was added sorbic acid as the conjugated polyene compound, and this mixture was further stirred for 1 hour such that sorbic acid was completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. After the resulting porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined using the method for quantitative determination. It is to be noted that resin compositions of Comparative Examples 1, 3 and 4 were prepared such that the content of each component was as shown in Table 2 by adjusting the concentration of each component in the aqueous solution for the immersion treatment. In this procedure, the content of the saturated aldehyde (B-1) was less than the detection lower limit.

Comparative Example 5

Resin composition pellets were prepared in a similar manner to Example 1 except that the saturated aldehyde was not used.

Examples 23 to 31, 34 to 40 and 43, and Comparative Example 8

Twenty kg of the pellets obtained by deliquoring in Synthesis Example 1 were added to 180 kg of a mixed solvent of water and methanol (mass ratio: water/methanol=40/60), and the mixture was stirred at 60° C. for 6 hours to completely dissolve the pellets. To the solution thus obtained were added the saturated ketone (B-2) and the conjugated polyene compound, and this mixture was further stirred for 1 hour such that the saturated ketone (B-2) and the conjugated polyene compound were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. After the resulting porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined using the method for quantitative determination. It is to be noted that resin compositions were prepared such that the content of each component was as shown in Tables 3 and 4 by adjusting the amount of the saturated ketone (B-2) added, and the concentration of each component in the aqueous solution for the immersion treatment.

Example 32

Resin composition pellets were prepared in a similar manner to Example 23 except that myrcene was used in place of sorbic acid as the conjugated polyene compound.

Example 33

Resin composition pellets were prepared in a similar manner to Example 23 except that potassium sorbate was used in place of sorbic acid as the conjugated polyene compound.

Example 41

Resin composition pellets were prepared in a similar manner to Example 23 except that methyl ethyl ketone was used in place of acetone as the saturated ketone.

Example 42

Resin composition pellets were prepared in a similar manner to Example 23 except that 2-hexanone was used in place of acetone as the saturated ketone.

Comparative Example 7, 9 and 10

Twenty kg of the pellets obtained in Synthesis Example 3 were added to 180 kg of a mixed solvent of water and methanol (mass ratio: water/methanol=40/60), and the mixture was stirred at 60° C. for 6 hours to completely dissolve the pellets. To the solution thus obtained was added sorbic acid as the conjugated polyene compound, and this mixture was further stirred for 1 hour such that sorbic acid was completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. After the resulting porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined using the method for quantitative determination. It is to be noted that resin compositions of Comparative Examples 7, 9 and 10 were prepared such that the content of each component was as shown in Table 4 by adjusting the concentration of each component in the aqueous solution for the immersion treatment. In this procedure, the content of the saturated ketone (B-2) was less than the detection lower limit.

Comparative Example 11

Resin composition pellets were prepared in a similar manner to Example 23 except that the saturated ketone was not used.

Evaluation of Resin Composition

The resin compositions thus obtained were evaluated for an odor in molding, long-run workability, a film appearance, an appearance of the solution, and a motor torque fluctuation according to the following methods. The results of the evaluations are shown in Tables 1 to 4.

Odor in Molding

A single-layer film having a thickness of 20 μm was produced from the dry pellets of each resin composition using a single screw extrusion apparatus ("D2020" available from Toyo Seiki Seisaku-sho, Ltd.; D (mm)=20, L/D=20, compression ratio=2.0; screw: full flight) according to the following conditions.

Test Condition extrusion temperature: 220° C.
screw rotation speed: 40 rpm
die width: 30 cm
roll drawing temperature: 80° C.
roll drawing speed: 3.1 m/min A continuous operation was carried out under the conditions described above to produce a single-layer film, and 20 g of the film produced after 8 hours and after 15 hours from the start of the operation were sampled. The sampled film was charged into a 100 mL glass sample tube, and the opening of the sample tube was covered with an aluminum foil lid. Then, the sample tube was heated in a hot-air dryer at 220° C. for 30 min. The sample tube was taken out from the dryer and allowed to cool at room temperature for 30 min. Thereafter, the sample tube was shaken two or three times, and checked for an odor after removing the aluminum foil lid. The intensity of the odor of the film was evaluated according to the following criteria.

A: an odor not being recognized;
B: an odor being slightly recognized; and
C: an odor being clearly recognized.

Long-Run Workability

With respect to the film produced after 8 hours and after 15 hours from the start of the operation in a similar manner to the procedure in the evaluation of the odor in molding, the number of defects per film length of 17 cm was counted. The counting of the number of defects was carried out using a film defect inspection apparatus ("AI-10" available from Frontier system Inc.). It is to be noted that the detection camera of the apparatus was installed such that the lens thereof was positioned at a distance of 195 mm from the film surface. The long-run workability of each resin composition was evaluated according to the following criteria.

A (favorable): the number of defects being less than 50;
B (somewhat favorable): the number of defects being 50 or greater and less than 200; and
C (unfavorable): the number of defects being 200 or greater.

Coloring of End Face of Roll

The film produced after 8 hours and after 15 hours from the start of the operation in a similar manner to the procedure in the evaluation of the odor in molding was wound in a roll form, and coloring of the end face of the roll was checked. The coloring of the end face of the roll of each resin composition was evaluated according to the following criteria.

A (favorable): coloring not being found on the end face of the roll;
B (somewhat favorable): coloring being found on the end face of the roll, but acceptable as a product; and
C (unfavorable): coloring being clearly found on the end face of the roll.

Film Appearance

The appearance of the film produced after 15 hours from the start of the operation in a similar manner to the procedure in the evaluation of the odor in molding was checked by a visual inspection. The film appearance was evaluated in terms of streaks and coloring according to the following criteria.

Evaluation Criteria of Streaks

A (favorable): no streaks found;
B (somewhat favorable): streaks found; and
C (unfavorable): a large number of streaks found.

Evaluation Criteria of Coloring

A (favorable): colorless;
B (somewhat favorable): yellowed; and
C (unfavorable): significantly yellowed.

Appearance of Solution

Ten grams of pellets obtained by subjecting the dry resin composition pellets to a heat treatment in an air at 120° C. for 15 hours were charged into a 300 mL Erlenmeyer flask, and 100 mL of a mixed solution of water and propanol (mass ratio: water/propanol=45/55) was added thereto, followed by stirring at 75° C. for 3 hours. The solution was checked by a visual inspection. The appearance of the solution was evaluated in terms of the transparency and coloring of solution according to the following criteria.

Evaluation Criteria of Transparency

A (favorable): transparent (suspended matter recognizable by the visual inspection being absent);

B (somewhat favorable): somewhat turbid (suspended matter recognizable by the visual inspection being present); and C (unfavorable): turbid (suspended matter being present).

Evaluation Criteria of Coloring of Solution

A (favorable): colorless;

B (somewhat favorable): somewhat colored; and

C (unfavorable): significantly colored.

Motor Torque Fluctuation

Dry resin composition pellets in an amount of 60 g were kneaded in a Laboplast Mill ("20R200" available from Toyo Seiki Seisaku-sho, Ltd.; twin-screw counter rotating type) at 100 rpm and 260° C., and a time period which was required until the torque value reached 1.5 times the torque value after 5 min from the beginning of the kneading was determined. The motor torque fluctuation was evaluated according to the following criteria. It is to be noted that the viscosity of the resin composition during heating is a factor that affects the long-run workability in a secondary processing.

A (favorable): 60 min or longer;

B (somewhat favorable): 40 min or longer and shorter than 60 min; and

C (unfavorable): shorter than 40 min

TABLE 1

| | Saturated aldehyde | | Boron compound | | Conjugated polyene compound | | Acetic acid/acetic acid salt | | Phosphorus compound | |
|---|---|---|---|---|---|---|---|---|---|---|
| | type | content (ppm) | type | content (ppm) | type | content (ppm) | type | content (ppm) | Type | Content (ppm) |
| Example 1 | propanal | 35 | boric acid | 800 | sorbic acid | 200 | acetic acid-sodium acetate | 300 | potassium dihydrogen phosphate | 120 |
| Example 2 | propanal | 2.9 | boric acid | 800 | sorbic acid | 200 | acetic acid-sodium acetate | 300 | potassium dihydrogen phosphate | 120 |
| Example 3 | propanal | 0.3 | boric acid | 800 | sorbic acid | 200 | acetic acid-sodium acetate | 300 | potassium dihydrogen phosphate | 120 |
| Example 4 | propanal | 0.3 | boric acid | 10 | sorbic acid | 200 | acetic acid-sodium acetate | 300 | potassium dihydrogen phosphate | 120 |
| Example 5 | propanal | 0.3 | boric acid | 200 | sorbic acid | 200 | acetic acid-sodium acetate | 1,200 | potassium dihydrogen phosphate | 120 |
| Example 6 | propanal | 0.3 | boric acid | 2,500 | sorbic acid | 200 | acetic acid-sodium acetate | 1,200 | potassium dihydrogen phosphate | 120 |
| Example 7 | propanal | 0.3 | boric acid | 6,000 | sorbic acid | 200 | acetic acid-sodium acetate | 300 | potassium dihydrogen phosphate | 120 |
| Example 8 | propanal | 0.3 | boric acid | 800 | sorbic acid | 0.01 | acetic acid-sodium acetate | 300 | potassium dihydrogen phosphate | 120 |
| Example 9 | propanal | 0.3 | boric acid | 800 | sorbic acid | 2,000 | acetic acid-sodium acetate | 300 | potassium dihydrogen phosphate | 120 |
| Example 10 | propanal | 0.3 | boric acid | 800 | myrcene | 200 | acetic acid-sodium acetate | 300 | potassium dihydrogen phosphate | 300 |
| Example 11 | propanal | 0.3 | boric acid | 800 | potassium sorbate | 200 | acetic acid-sodium acetate | 300 | potassium dihydrogen phosphate | 120 |
| Example 12 | propanal | 0.3 | boric acid | 900 | sorbic acid | 200 | acetic acid-sodium acetate | 0 | potassium dihydrogen phosphate | 120 |
| Example 13 | propanal | 0.3 | boric acid | 800 | sorbic acid | 200 | acetic acid-sodium acetate | 3,000 | potassium dihydrogen phosphate | 120 |
| Example 14 | propanal | 0.3 | boric acid | 800 | sorbic acid | 200 | acetic acid-sodium acetate | 300 | potassium dihydrogen phosphate | 0 |

TABLE 1-continued

| | Evaluations | | | | | | | | | | |
|---|---|---|---|---|---|---|---|---|---|---|---|
| | odor in molding | | long-run workability | | coloring of end face of roll | | film | | appearance of solution | | motor torque |
| | after 8 hours | after 15 hours | after 8 hours | after 15 hours | after 8 hours | after 15 hours | appearance streaks | coloring | transparency | coloring | fluctuation |
| Example 1 | B | B | A | B | A | B | A | B | A | B | A |
| Example 2 | A | A | A | A | A | A | A | A | A | A | A |
| Example 3 | A | A | A | A | A | A | A | A | A | A | A |
| Example 4 | A | B | A | B | A | B | B | A | A | A | A |
| Example 5 | A | A | A | A | A | A | B | A | A | B | B |
| Example 6 | A | A | A | A | A | A | B | A | A | B | B |
| Example 7 | A | A | B | B | B | B | B | A | B | A | B |
| Example 8 | A | A | A | B | A | B | A | B | A | B | B |
| Example 9 | A | A | B | B | B | B | B | B | A | B | B |
| Example 10 | A | A | A | B | A | B | B | B | A | B | B |
| Example 11 | A | A | A | A | A | A | A | A | A | A | A |
| Example 12 | A | B | A | B | A | B | B | B | A | B | B |
| Example 13 | A | B | A | B | A | B | B | A | A | B | B |
| Example 14 | A | B | B | B | A | B | B | B | A | B | B |

TABLE 2

| | Saturated aldehyde | | Boron compound | | Conjugated polyene compound | | Acetic acid/acetic acid salt | | Phosphorus compound | |
|---|---|---|---|---|---|---|---|---|---|---|
| | type | content (ppm) | type | content (ppm) | type | content (ppm) | type | content (ppm) | Type | content (ppm) |
| Example 15 | propanal | 0.3 | boric acid | 800 | sorbic acid | 200 | acetic acid-sodium acetate | 300 | potassium dihydrogen phosphate | 500 |
| Example 16 | propanal | 0.3 | boric acid | 800 | sorbic acid | 200 | acetic acid-sodium acetate | 300 | potassium dihydrogen phosphate | 120 |
| Example 17 | propanal | 0.08 | boric acid | 800 | sorbic acid | 1,200 | acetic acid-sodium acetate | 300 | potassium dihydrogen phosphate | 120 |
| Example 18 | propanal | 90 | boric acid | 800 | sorbic acid | 50 | acetic acid-sodium acetate | 300 | potassium dihydrogen phosphate | 120 |
| Example 19 | butanal | 35 | boric acid | 800 | sorbic acid | 200 | acetic acid-sodium acetate | 1,500 | potassium dihydrogen phosphate | 120 |
| Example 20 | hexanal | 35 | boric acid | 800 | sorbic acid | 200 | acetic acid-sodium acetate | 300 | potassium dihydrogen phosphate | 300 |
| Example 21 | propanal | 0.02 | boric acid | 800 | sorbic acid | 30 | acetic acid-sodium acetate | 300 | potassium dihydrogen phosphate | 300 |
| Comparative Example 1 | propanal | N.D.*1 | boric acid | 800 | sorbic acid | 200 | acetic acid-sodium acetate | 3,500 | potassium dihydrogen phosphate | 300 |
| Comparative Example 2 | propanal | 500 | boric acid | 800 | sorbic acid | 1,200 | acetic acid-sodium acetate | 300 | potassium dihydrogen phosphate | 120 |
| Comparative Example 3 | propanal | N.D.*1 | boric acid | 800 | sorbic acid | 200 | acetic acid-sodium acetate | 300 | potassium dihydrogen phosphate | 120 |
| Comparative Example 4 | propanal | N.D.*1 | boric acid | 800 | sorbic acid | 0.01 | acetic acid-sodium acetate | 300 | potassium dihydrogen phosphate | 120 |
| Comparative Example 5 | propanal | N.D.*1 | boric acid | 6,000 | sorbic acid | 0.01 | acetic acid-sodium acetate | 3,000 | potassium dihydrogen phosphate | 500 |

TABLE 2-continued

| | Evaluations | | | | | | | | | | |
|---|---|---|---|---|---|---|---|---|---|---|---|
| | odor in molding | | long-run workability | | coloring of end face of roll | | film appearance | | appearance of solution | | motor torque |
| | after 8 hours | after 15 hours | after 8 hours | after 15 hours | after 8 hours | after 15 hours | streaks | coloring | transparency | coloring | fluctuation |
| Example 15 | A | B | B | B | A | B | B | A | A | A | B |
| Example 16 | A | A | A | A | A | A | A | A | A | A | A |
| Example 17 | A | B | A | B | B | B | B | A | A | B | A |
| Example 18 | B | B | B | B | A | A | B | B | A | B | A |
| Example 19 | B | B | A | B | A | B | B | B | A | B | B |
| Example 20 | B | B | A | B | A | B | B | B | A | B | B |
| Example 21 | B | B | A | B | B | C | B | B | A | B | B |
| Comparative Example 1 | C | C | B | C | C | C | C | C | C | C | C |
| Comparative Example 2 | C | C | C | C | B | C | C | C | C | C | C |
| Comparative Example 3 | C | C | B | C | B | C | C | B | B | C | C |
| Comparative Example 4 | C | C | B | C | B | B | C | B | C | C | C |
| Comparative Example 5 | C | C | C | C | C | C | C | C | C | C | C |

N.D.*[1]: less than detection lower limit (0.01 ppm) of saturated aldehyde

TABLE 3

| | Saturated ketone | | Boron compound | | Conjugated polyene compound | | Acetic acid/acetic acid salt | | Phosphorus compound | |
|---|---|---|---|---|---|---|---|---|---|---|
| | type | content (ppm) | type | content (ppm) | type | content (ppm) | type | content (ppm) | Type | content (ppm) |
| Example 23 | acetone | 35 | boric acid | 800 | sorbic acid | 200 | acetic acid-sodium acetate | 300 | potassium dihydrogen phosphate | 120 |
| Example 24 | acetone | 2.9 | boric acid | 800 | sorbic acid | 200 | acetic acid-sodium acetate | 300 | potassium dihydrogen phosphate | 120 |
| Example 25 | acetone | 0.3 | boric acid | 800 | sorbic acid | 200 | acetic acid-sodium acetate | 300 | potassium dihydrogen phosphate | 120 |
| Example 26 | acetone | 0.3 | boric acid | 10 | sorbic acid | 200 | acetic acid-sodium acetate | 300 | potassium dihydrogen phosphate | 120 |
| Example 27 | acetone | 0.3 | boric acid | 200 | sorbic acid | 200 | acetic acid-sodium acetate | 1,200 | potassium dihydrogen phosphate | 120 |
| Example 28 | acetone | 0.3 | boric acid | 2,500 | sorbic acid | 200 | acetic acid-sodium acetate | 1,200 | potassium dihydrogen phosphate | 120 |
| Example 29 | acetone | 0.3 | boric acid | 6,000 | sorbic acid | 200 | acetic acid-sodium acetate | 300 | potassium dihydrogen phosphate | 120 |
| Example 30 | acetone | 0.3 | boric acid | 800 | sorbic acid | 0.01 | acetic acid-sodium acetate | 300 | potassium dihydrogen phosphate | 120 |
| Example 31 | acetone | 0.3 | boric acid | 800 | sorbic acid | 2,000 | acetic acid-sodium acetate | 300 | potassium dihydrogen phosphate | 120 |
| Example 32 | acetone | 0.3 | boric acid | 800 | myrcene | 200 | acetic acid-sodium acetate | 300 | potassium dihydrogen phosphate | 300 |
| Example 33 | acetone | 0.3 | boric acid | 800 | potassium sorbate | 200 | acetic acid-sodium acetate | 300 | potassium dihydrogen phosphate | 120 |
| Example 34 | acetone | 0.3 | boric acid | 800 | sorbic acid | 200 | acetic acid-sodium acetate | 0 | potassium dihydrogen phosphate | 120 |

TABLE 3-continued

| | | | | | | | | | |
|---|---|---|---|---|---|---|---|---|---|
| Example 35 | acetone | 0.3 | boric acid | 800 | sorbic acid | 200 | acetic acid-sodium acetate | 3,000 | potassium dihydrogen phosphate | 120 |
| Example 36 | acetone | 0.3 | boric acid | 800 | sorbic acid | 200 | acetic acid-sodium acetate | 300 | potassium dihydrogen phosphate | 0 |

| | Evaluations ||||||||||
|---|---|---|---|---|---|---|---|---|---|---|
| | odor in molding || long-run workability || coloring of end face of roll || film || appearance of solution || motor torque |
| | after 8 hours | after 15 hours | after 8 hours | after 15 hours | after 8 hours | after 15 hours | appearance streaks | coloring | transparency | coloring | fluctuation |
| Example 23 | B | B | A | B | A | B | A | B | A | B | A |
| Example 24 | A | A | A | A | A | A | A | A | A | A | A |
| Example 25 | A | A | A | A | A | A | A | A | A | A | A |
| Example 26 | A | B | A | B | A | B | B | A | A | A | A |
| Example 27 | A | A | A | A | A | A | B | A | A | B | B |
| Example 28 | A | A | A | A | A | A | B | A | A | B | B |
| Example 29 | A | A | B | B | B | B | B | A | B | A | B |
| Example 30 | A | A | A | B | A | B | A | B | A | B | B |
| Example 31 | A | A | B | B | B | B | B | B | A | B | B |
| Example 32 | A | A | A | B | A | B | B | B | A | B | B |
| Example 33 | A | A | A | A | A | A | A | A | A | A | A |
| Example 34 | A | B | A | B | A | B | B | B | A | B | B |
| Example 35 | A | B | A | B | A | B | B | A | A | B | B |
| Example 36 | A | B | B | B | A | B | B | B | A | B | B |

TABLE 4

| | Saturated ketone || Boron compound || Conjugated polyene compound || Acetic acid/acetic acid salt || Phosphorus compound ||
|---|---|---|---|---|---|---|---|---|---|---|
| | type | content (ppm) | type | content (ppm) | type | content (ppm) | type | content (ppm) | Type | content (ppm) |
| Example 37 | acetone | 0.3 | boric acid | 800 | sorbic acid | 200 | acetic acid-sodium acetate | 300 | potassium dihydrogen phosphate | 500 |
| Example 38 | acetone | 0.3 | boric acid | 800 | sorbic acid | 200 | acetic acid-sodium acetate | 300 | potassium dihydrogen phosphate | 120 |
| Example 39 | acetone | 0.08 | boric acid | 800 | sorbic acid | 1,200 | acetic acid-sodium acetate | 300 | potassium dihydrogen phosphate | 120 |
| Example 40 | acetone | 90 | boric acid | 800 | sorbic acid | 50 | acetic acid-sodium acetate | 300 | potassium dihydrogen phosphate | 120 |
| Example 41 | methyl ethyl ketone | 35 | boric acid | 800 | sorbic acid | 200 | acetic acid-sodium acetate | 1,500 | potassium dihydrogen phosphate | 120 |
| Example 42 | 2-hexanone | 35 | boric acid | 800 | sorbic acid | 200 | acetic acid-sodium acetate | 300 | potassium dihydrogen phosphate | 300 |
| Example 43 | acetone | 0.02 | boric acid | 800 | sorbic acid | 30 | acetic acid-sodium acetate | 300 | potassium dihydrogen phosphate | 120 |
| Comparative Example 7 | acetone | N.D.[*1] | boric acid | 800 | sorbic acid | 200 | acetic acid-sodium acetate | 1,500 | potassium dihydrogen phosphate | 300 |
| Comparative Example 8 | acetone | 500 | boric acid | 800 | sorbic acid | 1,200 | acetic acid-sodium acetate | 300 | potassium dihydrogen phosphate | 120 |
| Comparative Example 9 | acetone | N.D.[*1] | boric acid | 800 | sorbic acid | 200 | acetic acid-sodium acetate | 300 | potassium dihydrogen phosphate | 120 |

TABLE 4-continued

| | | | | | | | | | | |
|---|---|---|---|---|---|---|---|---|---|---|
| Comparative Example 10 | acetone | N.D.*[1] | boric acid | 800 | sorbic acid | 0.01 | acetic acid-sodium acetate | 300 | potassium dihydrogen phosphate | 120 |
| Comparative Example 11 | acetone | N.D.*[1] | boric acid | 6,000 | sorbic acid | 0.01 | acetic acid-sodium acetate | 3,000 | potassium dihydrogen phosphate | 500 |

| | Evaluations | | | | | | | | | | |
|---|---|---|---|---|---|---|---|---|---|---|---|
| | odor in molding | | long-run workability | | coloring of end face of roll | | film | | appearance of solution | | motor torque |
| | after 8 hours | after 15 hours | after 8 hours | after 15 hours | after 8 hours | after 15 hours | appearance streaks | coloring | transparency | coloring | fluctuation |
| Example 37 | A | B | B | B | A | B | B | A | A | A | B |
| Example 38 | A | A | A | A | A | A | A | A | A | A | A |
| Example 39 | A | A | A | B | B | B | B | A | A | B | A |
| Example 40 | B | B | B | B | B | B | A | B | A | B | A |
| Example 41 | B | B | A | B | A | B | B | B | A | B | B |
| Example 42 | B | B | A | B | A | B | B | B | A | B | B |
| Example 43 | B | B | A | B | A | B | A | A | A | B | A |
| Comparative Example 7 | C | C | B | C | B | C | C | C | C | C | C |
| Comparative Example 8 | C | C | C | C | C | C | C | C | C | C | C |
| Comparative Example 9 | C | C | B | C | B | C | C | B | B | C | C |
| Comparative Example 10 | C | C | B | C | B | C | C | B | C | C | C |
| Comparative Example 11 | C | C | C | C | C | C | C | C | C | C | C |

N.D.*[1]: less than detection lower (0.01 ppm) of saturated ketone

As shown in Tables 1 to 4, the resin compositions of Examples 1 to 21 and 23 to 43 gave a film exhibiting inhibited odor in molding and coloring of end face of the roll as well as minimized coloring and generation of the streaks, and consequently having superior appearance characteristics. Moreover, it was proven that in the resin compositions of Examples 1 to 21 and 23 to 43, the motor torque fluctuation during heating was inhibited and the number of generated defects in the film formation was reduced, indicating superior long-run workability during the melt molding.

Production of Multilayer Structure

Example 22

Using a cast film formation equipment for seven-layer coextrusion, which included the following four types of extruders, a coextruded film formation test of the multilayer film as the multilayer structure was carried out.

extruder (1) for outer polyolefin layer: single screw, screw diameter of 65 mm, L/D=22 extruder (2) for polyolefin: single screw, screw diameter of 40 mm, L/D=26 extruder (3) for adhesive resin: single screw, screw diameter of 40 mm, L/D=22 extruder (4) for EVOH: single screw, screw diameter of 40 mm, L/D=26

Coextrusion film formation was executed by feeding polypropylene (hereinafter, may be also referred to as "PP") into the extruder (1) and the extruder (2), a maleic anhydride-modified polypropylene adhesive resin ("ADMER QF-500" available from Mitsui Chemicals, Inc.) into the extruder (3), and the resin composition obtained in Example 1 into the extruder (4) to obtain a multilayer film having a 7-layer structure and a total thickness of 100 μm. The extrusion temperature setting was: 200 to 250° C. for the extruder (1); 200 to 250° C. for the extruder (2); 160 to 250° C. for the extruder (3); and 170 to 250° C. for the extruder (4), and the temperature setting of the feed block and the die was 250° C. The constitution and thickness of the multilayer film was PP/PP/adhesive resin/resin composition/adhesive resin/PP/PP=30 μm/15 μm/2.5 μm/5 μm/2.5 μm/15 μm/30 μm.

The multilayer film was sampled after 10 hours from the start of the film formation, and the appearance thereof was observed. Consequently, an unfavorable appearance resulting from the aggregation of the EVOH and flow marks resulting from abnormal flow were scarcely found. Accordingly, a practically applicable multilayer film was obtained.

Comparative Example 6

A multilayer film was produced in a similar manner to Example 22 except that the resin composition of Example 1 was replaced with the resin composition obtained in Comparative Example 5, and the multilayer film was sampled after 10 hours from the start of the film formation. The appearance of the multilayer film was checked, and consequently an unfavorable appearance resulting from the aggregation of the EVOH and many flow marks resulting from abnormal flow were found.

Example 44

A multilayer film was produced in a similar manner to Example 22 except that the resin composition of Example 1 was replaced with the resin composition obtained in Example 23, and the multilayer film was sampled after 10 hours from the start of the film formation. The appearance of the multilayer film was checked, and consequently an unfavorable appearance resulting from the aggregation of the EVOH and flow marks resulting from abnormal flow were scarcely found. Accordingly, a practically applicable multilayer film was obtained.

Comparative Example 12

A multilayer film was produced in a similar manner to Example 22 except that the resin composition of Example 1 was replaced with the resin composition obtained in Comparative Example 11, and the multilayer film was sampled after 10 hours from the start of the film formation. The appearance of the multilayer film was checked, and consequently an unfavorable appearance resulting from the aggregation of the EVOH and many flow marks resulting from abnormal flow were found.

INDUSTRIAL APPLICABILITY

According to the resin composition of the embodiment of the present invention, the coloring and the generation of the defects during the melt molding can be inhibited, and consequently formed articles having superior appearance characteristics can be provided. In addition, according to the resin composition, even when melt molding is executed over a long time period, defects and an odor are less likely to be generated, and consequently superior long-run workability can be exhibited. Thus, the resin composition can be formed into containers, films, sheets and the like, and the formed products can be suitably used as a multilayer structure and various types of packaging materials, and the like.

The invention claimed is:

1. A resin composition comprising:
an ethylene-vinyl alcohol copolymer (A); and
a saturated carbonyl compound (B) having 3 to 8 carbon atoms,
wherein the saturated carbonyl compound (B) is a saturated aldehyde (B-1), a saturated ketone (B-2) or a combination thereof, and
a content of the saturated carbonyl compound (B) is 0.01 ppm or greater and 100 ppm or less.

2. The resin composition according to claim 1, wherein the saturated carbonyl compound (B) is the saturated aldehyde (B-1), and the saturated aldehyde (B-1) is propanal, butanal, hexanal or a combination thereof.

3. The resin composition according to claim 1, wherein the saturated carbonyl compound (B) is the saturated ketone (B-2), and the saturated ketone (B-2) is acetone, methyl ethyl ketone, 2-hexanone or a combination thereof.

4. The resin composition according to claim 1, further comprising a boron compound, wherein a content of the boron compound is 100 ppm or greater and 5,000 ppm or less.

5. The resin composition according to claim 1, further comprising a conjugated polyene compound,
wherein a content of the conjugated polyene compound is 0.01 ppm or greater and 1,000 ppm or less.

6. The resin composition according to claim 5, wherein the conjugated polyene compound is sorbic acid, a sorbic acid salt or a combination thereof.

7. The resin composition according to claim 1, further comprising at least one of acetic acid and an acetic acid salt, wherein a total content of acetic acid and the acetic acid salt is 50 ppm or greater and 1,000 ppm or less.

8. The resin composition according to claim 1, further comprising a phosphorus compound, wherein a content of the phosphorus compound is 1 ppm or greater and 200 ppm or less.

9. A product formed from the resin composition according to claim 1.

10. A multilayer structure comprising a layer formed from the resin composition according to claim 1.

* * * * *